United States Patent [19]

Ando et al.

[11] Patent Number: 5,403,248
[45] Date of Patent: Apr. 4, 1995

[54] CONTROL SYSTEM FOR CHANGING SERVO TIMINGS OF HYDRAULIC PRESSURE BASED ON A TORQUE INPUT IN AUTOMATIC TRANSMISSION

[75] Inventors: Masahiko Ando, Okazaki; Koji Noda, Anjo; Yoshihisa Yamamoto, Nishio; Masahiro Hayabuchi, Anjo; Kazumasa Tsukamoto, Toyota; Yasuo Hojo, Nagoya; Yutaka Taga; Hidehiro Oba, both of Aichi, all of Japan

[73] Assignees: Aisin AW Co., Ltd.; Toyota Jidosha Kabushiki Kaisha, both of Japan

[21] Appl. No.: 982,697

[22] Filed: Nov. 27, 1992

[30] Foreign Application Priority Data

Dec. 3, 1991 [JP] Japan .................. 3-344122

[51] Int. Cl.[6] ............... F16H 61/04; F16H 61/08
[52] U.S. Cl. ................... 477/130; 477/131; 477/132; 477/143
[58] Field of Search ................. 74/867, 868, 866; 477/130, 131, 143, 164, 132, 133, 135, 136

[56] References Cited

U.S. PATENT DOCUMENTS

| | | | |
|---|---|---|---|
| 4,727,773 | 3/1988 | Sumiya et al. | 74/867 |
| 4,770,064 | 9/1988 | Kuerschner | 74/867 X |
| 4,854,195 | 8/1989 | Moroto et al. | 74/867 |
| 4,922,424 | 5/1990 | Hiramatsu | 74/866 |
| 4,953,090 | 8/1990 | Narita | 74/866 X |
| 5,038,638 | 8/1991 | Hayakawa et al. | 74/867 X |
| 5,119,695 | 6/1992 | Milunas et al. | 74/866 |
| 5,119,697 | 6/1992 | Vukovich et al. | 74/867 |
| 5,184,528 | 2/1993 | Mochizuki | 74/867 x |

FOREIGN PATENT DOCUMENTS 53-81881 7/1978 Japan .

*Primary Examiner*—Dirk Wright
*Assistant Examiner*—Khoi Q. Ta

[57] ABSTRACT

A control system is provided for servo hydraulic pressure in an automatic transmission having planetary gear mechanisms. First and second frictional engagement devices, whose servo pressures are reversed in feed/drain relationship between desired two high speed stages, are controlled by a shift valve and a directional control valve. The shift valve is switched by a first solenoid. The directional control valve is interposed in a servo hydraulic pressure feed/drain line communicating the shift valve with the first frictional engagement device and is controlled by a second solenoid. The first and second solenoids are controlled by an electronic control unit in accordance with a shift position detected by a detector, whereby the timings of feed or drain of the servo hydraulic pressures to or from the first and second frictional engagement devices are changed by predetermined relative amounts, respectively.

8 Claims, 5 Drawing Sheets

FIG. 3

| | SOLENOID | | | | | CLUTCH | | | BRAKE | | | | | ONE-WAY CLUTCH | | |
|---|---|---|---|---|---|---|---|---|---|---|---|---|---|---|---|---|
| | No.1 | No.2 | No.3 | No.4 | L-up | C-0 | C-1 | C-2 | B-0 | B-1 | B-2 | B-3 | B-4 | F-0 | F-1 | F-2 |
| P | O | X | X | X | X | X | X | X | X | X | X | X | O | O | X | X |
| R  V<Vo | O | O | O | O | X | X | X | O | O | X | X | X | O | X | X | X |
| R  V≥Vo | O | O | O | O | X | X | X | O | O | X | X | X | X | X | X | X |
| N | O | X | X | X | X | X | X | X | X | X | X | X | O | O | X | X |
| D  1ST | O | X | X | ⊗ | X | O | O | X | X | X | X | X | ⊗ | O | X | O |
| D  2ND | O | O | O | ⊗ | X | ⊗ | O | X | X | X | X | O | X | O | X | X |
| D  3RD | X | O | O | ⊗ | ⊚ | O | O | X | X | ⊗ | O | X | X | X | O | X |
| D  4TH | X | X | O | O | ⊚ | O | O | O | X | X | O | X | X | X | X | X |
| D  5TH | X | X | O | O | ⊚ | X | O | O | O | X | O | X | X | X | X | X |

REMARKS:
- O : ON
- X : OFF
- ⊚ : SOL ON: L-UP ON, SOL OFF: L-UP OFF
- O : SOL ON: engine brake not applied, SOL ON: engine brake applied
- Engaged / Released
- Engaged when engine brake is applied
- Locked / Free

CONTROL SYSTEM FOR CHANGING SERVO TIMINGS OF HYDRAULIC PRESSURE BASED ON A TORQUE INPUT IN AUTOMATIC TRANSMISSION

BACKGROUND OF THE INVENTION

1. Field of the Invention

This invention relates to a control system for an automatic transmission, especially to a control system for servo hydraulic pressure engaging or releasing frictional engagement means for changing the gear ratio of an automatic transmission.

2. Description of the Related Art

Automatic transmissions for vehicles are generally provided with plural planetary gear mechanisms. Upon shifting the gear speed, shifting elements (gears, carriers, ring gears) of these planetary gear mechanisms are connected in accordance with engagement or release of frictional engagement elements to establish the proper power flow. In such transmissions, it has been conventional to provide the feed line to each frictional engagement element with an accumulator to reduce shock upon engagement of the frictional engagement elements. Thus, the increase in servo hydraulic pressure at the time of the engagement is controlled by the pressure-accumulating function of the accumulator.

In such an automatic transmission, it may be necessary, depending on the arrangement of planetary gear mechanisms, to have frictional elements of different frictional engagement mechanisms engage at the time of shifting. Where one of such frictional engagement mechanisms is a clutch, drainage of hydraulic pressure from the servo cylinder for the clutch cannot be effected smoothly due to the influence of centrifugal force applied to working oil still remaining in the servo cylinder, i.e. the so-called centrifugal hydraulic pressure, because the rotational speed of the clutch is high upon releasing the clutch at a high speed stage. As a result, "tie-up" occurs between the clutch and the other, simultaneously-engaged frictional engagement mechanism. Conversely, when the clutch is engaged, the influence of the centrifugal hydraulic pressure serves to advance the engagement of the clutch and to increase the rotational speed of the engine. Thus, in both release and engagement, the centrifugal hydraulic pressure results in an increased shift shock.

SUMMARY OF THE INVENTION

With the foregoing in mind, the present invention has as a primary object the provision of a control system for servo hydraulic pressure in an automatic transmission, which system can avoid the influence of the above-described centrifugal hydraulic pressure and hence can reduce shift shocks at high speed stages by controlling and changing, in accordance with the running state of the vehicle, the timing of feed or draining of servo pressure to and from first and second frictional engagement elements which are alternatively engaged upon shifting.

To overcome the above problem, the present invention therefore provides a control system for servo hydraulic pressure in an automatic transmission provided with planetary gear mechanisms disposed between an input shaft and an output shaft so that shifting elements of the planetary gear mechanisms can be connected under control by servo hydraulic pressure to establish a different power flow path in accordance with engagement or release of frictional engagement elements and hence to achieve plural speed stages. The control system of the present invention includes first and second frictional engagement means whose servo pressures are reversed between feeding and draining in shifting between two high speed stages; a shift valve for controlling feeding and draining of servo hydraulic pressure to and from each of the first and second frictional engagement elements, the shift valve being switchable between the desired two high speed gear stages; a first solenoid for controlling the shift valve; a directional control valve interposed in a servo hydraulic pressure feed/-drain line through which the shift valve and the first frictional engagement element communicate; a second solenoid for controlling the directional control valve; an electronic control unit for outputting control signals to the first and second solenoids, respectively; and a detector for detecting a shift position and inputting the detected shift position to the electronic control unit.

The timings for feeding and draining the servo hydraulic pressure to and from the first frictional engagement element and the second frictional engagement element are changed by predetermined relative amounts, respectively, by the control signals delivered from the electronic control unit to the first and second solenoids in accordance with the shift position detected by the detector.

In the servo hydraulic pressure control system of the present invention, the timings of feeding and draining of servo hydraulic pressure to and from the first frictional engagement element and the second frictional engagement element are changed by predetermined relative amounts by switching control signals from the electronic control unit in accordance with a shift position detected by the detector. This makes it possible to perform the engagement or release of both the first and second frictional engagement elements while taking into consideration any deviations of the timings of engagement or release due to centrifugal hydraulic pressure in the servo for the first frictional engagement element at a high speed stage, whereby shift shocks of the automatic transmission at high speed stages can be reduced.

BRIEF DESCRIPTION OF THE DRAWINGS

The above and other objects, features and advantages of the present invention will become apparent from the following description and the appended claims, taken in conjunction with the accompanying drawings, in which:

FIG. 3 is a gear engagement chart for the automatic transmission of FIG. 2;

DETAILED DESCRIPTION OF THE INVENTION AND PREFERRED EMBODIMENT

Figure 1:
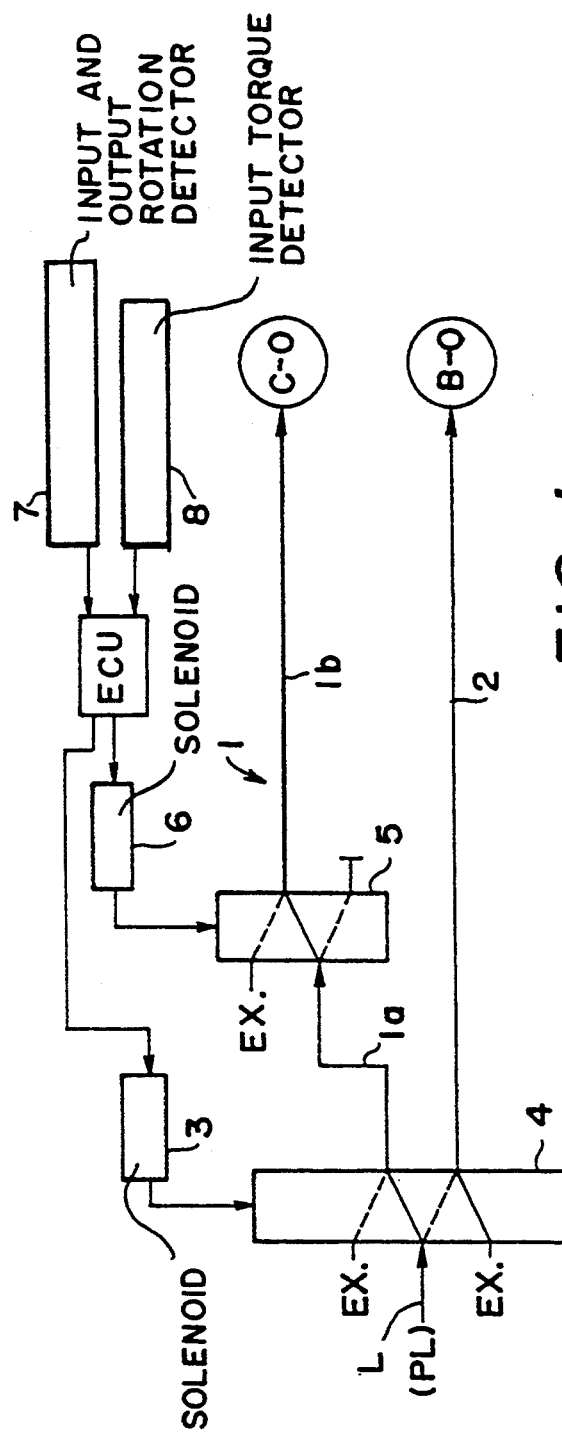
FIG. 1 is a schematic hydraulic circuit diagram of a servo hydraulic pressure control system according to one embodiment of the present invention.

The servo hydraulic pressure control system according to one embodiment of the present invention will hereinafter be described with reference to the accompanying drawings. The automatic transmission to which the servo hydraulic pressure control system of this invention is applied is a five-speed automatic transmission. As is understood from FIG. 2 which illustrates its gear train, a 4-forward/1-reverse primary shifting unit M is composed of an in-line train of three planetary gears and is combined with an inlet-side overdrive planetary gear (hereinafter abbreviated as "overdrive unit") OD. First and second frictional engagement elements, which are alternatively brought into engagement upon shifting, are a clutch C-0, which can be engaged to lock the overdrive unit OD to establish a non-overdrive state, and a brake B-0 engageable to actuate the overdrive unit OD to establish an overdrive state.

Describing the overall construction first, the automatic transmission in the illustrated embodiment is provided, as in the conventional art, with the over-drive unit OD and the primary shifting unit M in addition to a torque converter T equipped with a lockup clutch. The overdrive unit OD has a clutch C-0 for connecting or disconnecting a carrier CO and a sun gear SO as well as the brake B-0 for holding a one-way clutch F-0 and the sun gear SO. The primary shifting unit M is provided with three sets of planetary gears P1, P2, P3 connected together in series, in which individual shifting elements (sun gears S1–S3, carriers C1–C3, ring gears R1–R3), making up the planetary gears, are directly connected as needed. Arranged in association with the shifting elements of the individual gears are clutches C-1, C-2, brakes B-1 to B-4 and one-way clutches F-1, F-2. Although not shown in the drawing, the individual clutches and brakes, as the frictional engagement elements, are each provided, as in the conventional art, with servo means including a piston so that the corresponding frictional engagement element is engaged or released under control by servo control pressure.

In the automatic transmission, as depicted by its partial gear engagement chart shown in FIG. 3, at both fourth speed (4th) (a high speed stage) and at fifth speed (5th) (the highest speed stage), the engagement/release states of the individual clutches C-1, C-2 and brakes B-1 to B-3 are the same and the one-way clutches F-1, F-2 are both free. On the side of the overdrive unit OD, to establish an overdrive state at the fourth speed (4th), the clutch C-0 is engaged, the brake B-0 is released and the one-way clutch F-0 is locked. Turbine rotation of the torque converter TC is therefore inputted directly to an input shaft IM of the main shifting unit M. At the fifth speed (5th), on the other hand, to establish an overdrive state, the clutch C-0 is engaged, the brake B-0 is engaged, and the one-way clutch F-0 is free. Accordingly, turbine rotation of the torque converter TC, to be transmitted to the carrier CO, is accelerated by reaction force produced as a result of holding of the sun gear SO and is output from the ring gear RO, and overdrive rotation is transmitted to the input shaft IM of the main shifting unit M.

A shift from the fifth speed (5th) to the fourth speed (4th) (hereinafter abbreviated as a "5 → 4 shift") therefore requires that the brake B-0 be changed from the engaged state to the released state and that the clutch C-0 be changed from the released state to the engaged state. A shift from the fourth speed to the fifth speed (hereinafter abbreviated as a "4 → 5 shift"), conversely, requires that the brake B-0 be changed from the released state to the engaged state and that the clutch C-0 be changed from the engaged state to the released state.

Figure 5:
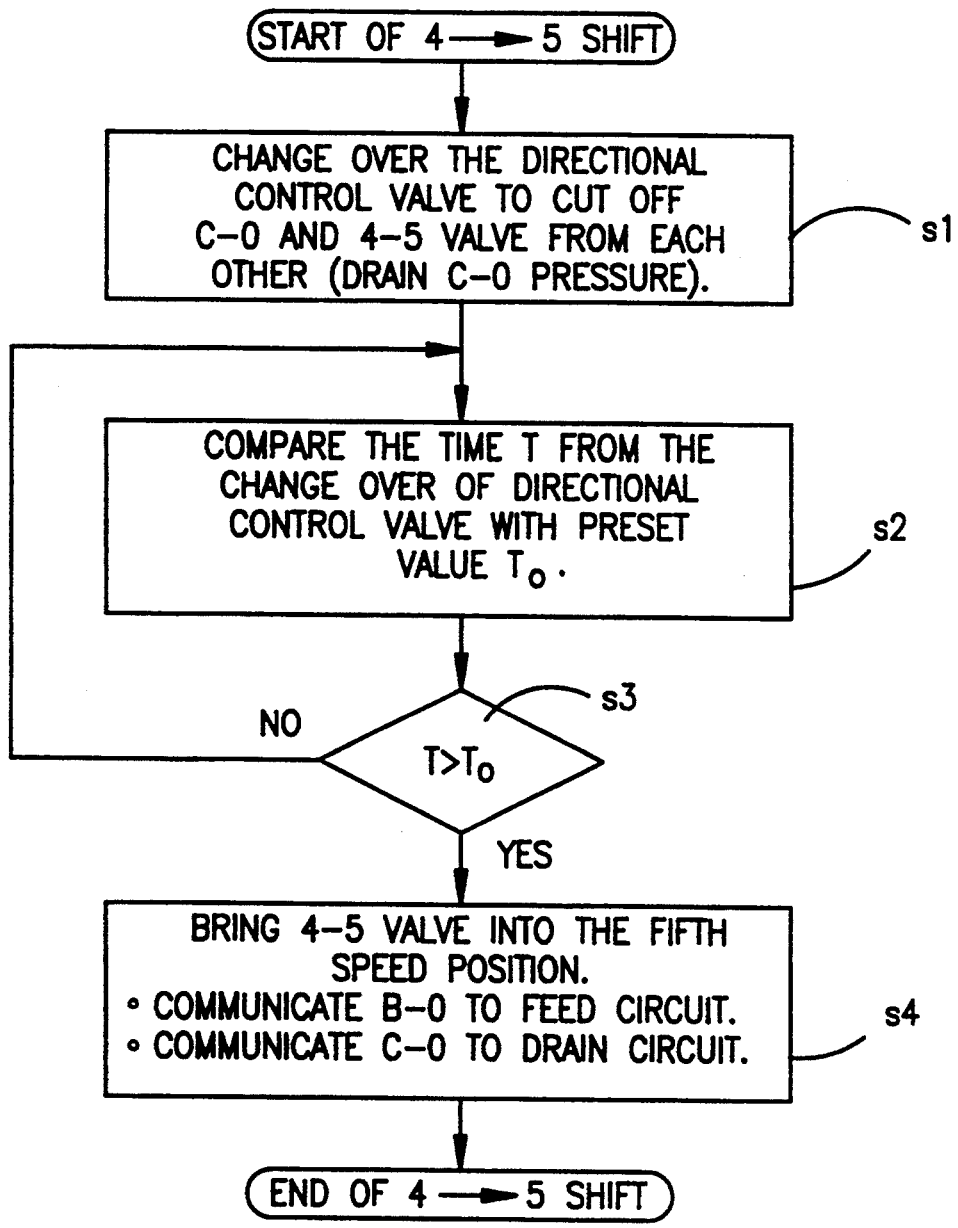
FIG. 5 is a flow chart illustrating control by the servo hydraulic pressure control system of FIG. 1 in a 4 → 5 shift.

Parts of the hydraulic control circuit pertaining to the present invention, are selectively and schematically illustrated in FIG. 1 and are also shown in detail together with their associated parts in FIG. 5. A servo hydraulic feed/drain line 1 for the clutch C-0 (the "first frictional engagement element") and a servo hydraulic feed/drain line 2 for the brake B-0 (the "second frictional engagement element") are connected to a main working oil line L via a 4 → 5 shift valve 4 which is controlled and changed over by a first solenoid 3 (i.e., the SL3 solenoid in FIG. 6) which is in turn actuated by a signal from the electronic control unit ECU 22 in accordance with running conditions such as the running speed of the vehicle and the degree of opening of a throttle of the engine at the time of a 4 → 5 shift or a 5 → 4 shift. Further a directional control valve 5 is provided in the servo hydraulic pressure feed/drain line 1 so that the servo hydraulic pressure feed/drain line 1 is divided into a feed/drain line 1a extending from the 4–5 shift valve 4 to the directional control valve 5 and a feed/drain line 3b extending from the directional control valve 5 to the clutch C-0.

Figure 6:
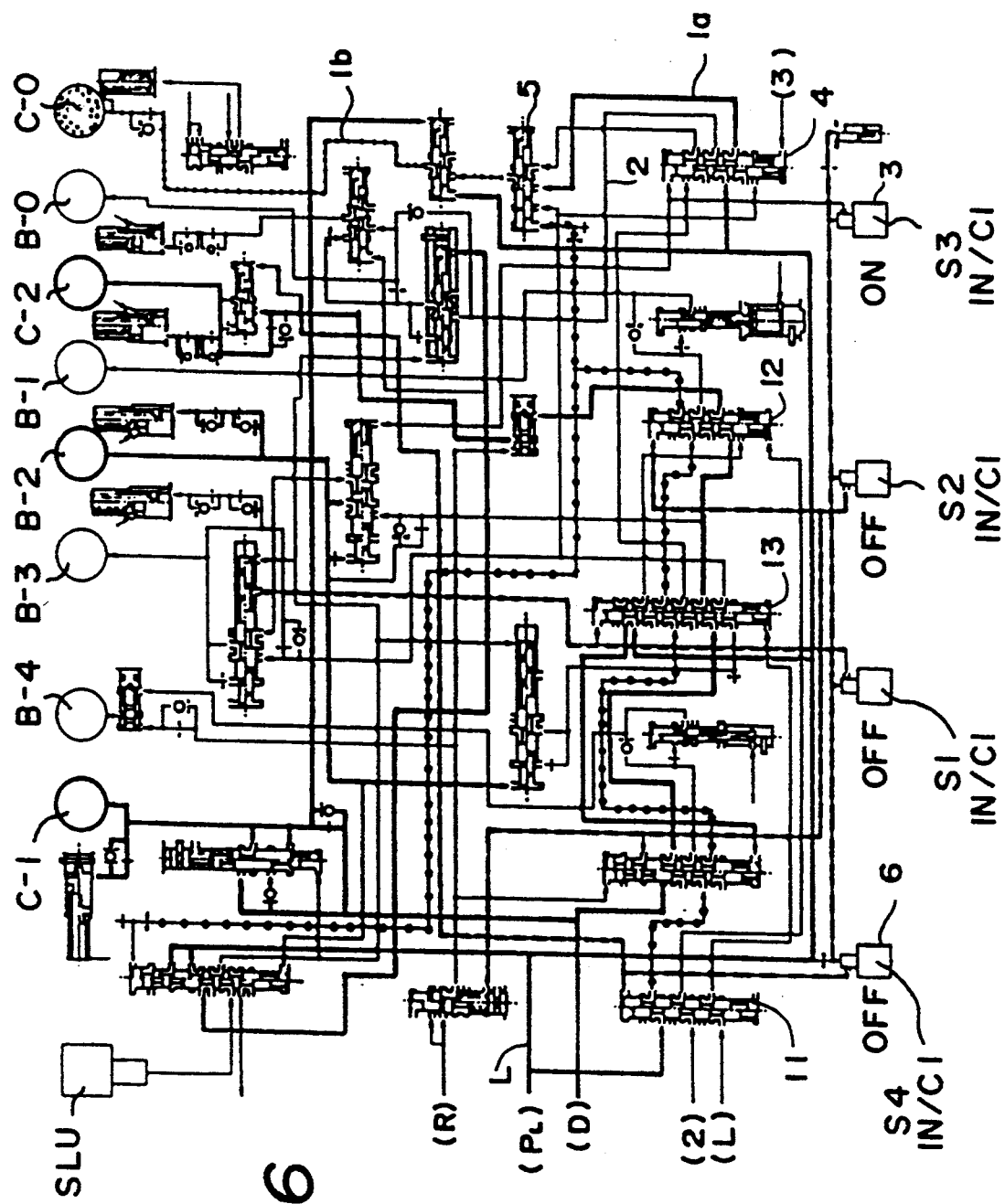
FIG. 6 is a fragmentary diagram of the hydraulic circuit of the automatic transmission of FIG. 2.

The directional control valve 5 is constructed in such a manner to optionally provide for connection of both the feed/drain lines 1a, 1b, for disconnection of the feed/drain lines 1a, 1b and for communication of the feed/drain line 1b with a drain EX. In this embodiment, a C-0 exhaust valve is provided in the circuit to eliminate application of an engine brake at a second speed as shown in FIG. 6, i.e. the directional control valve 5. A second solenoid valve 6, which controls the directional control valve 5, is the SL4 solenoid which controls an engine brake control valve 11 which in turn sends a signal pressure along lines indicated by circles in the drawing. The electronic control unit ECU 22, which outputs control signals to the first and second solenoids 3, 6, respectively, is provided for controlling the individual SL1 to SL4 solenoids and the SLU linear solenoid of the hydraulic control system. The detector 20 for inputting shift position to the electronic control unit ECU 22 is shown in FIG. 1 as including an input-output rotation detector 7 for detecting the numbers of input rotation and output rotation of the transmission from rotation of the input shaft I and that of the output shaft OM as well as an input torque detector 8 for detecting input torque to the transmission.

As to the specific construction of each element, a circuit portion downstream of a manual valve is shown in detail in FIG. 6, in which elements of structure corresponding to those shown in FIG. 1 are designated by like reference numerals and their specific description is omitted here.

Figure 4:
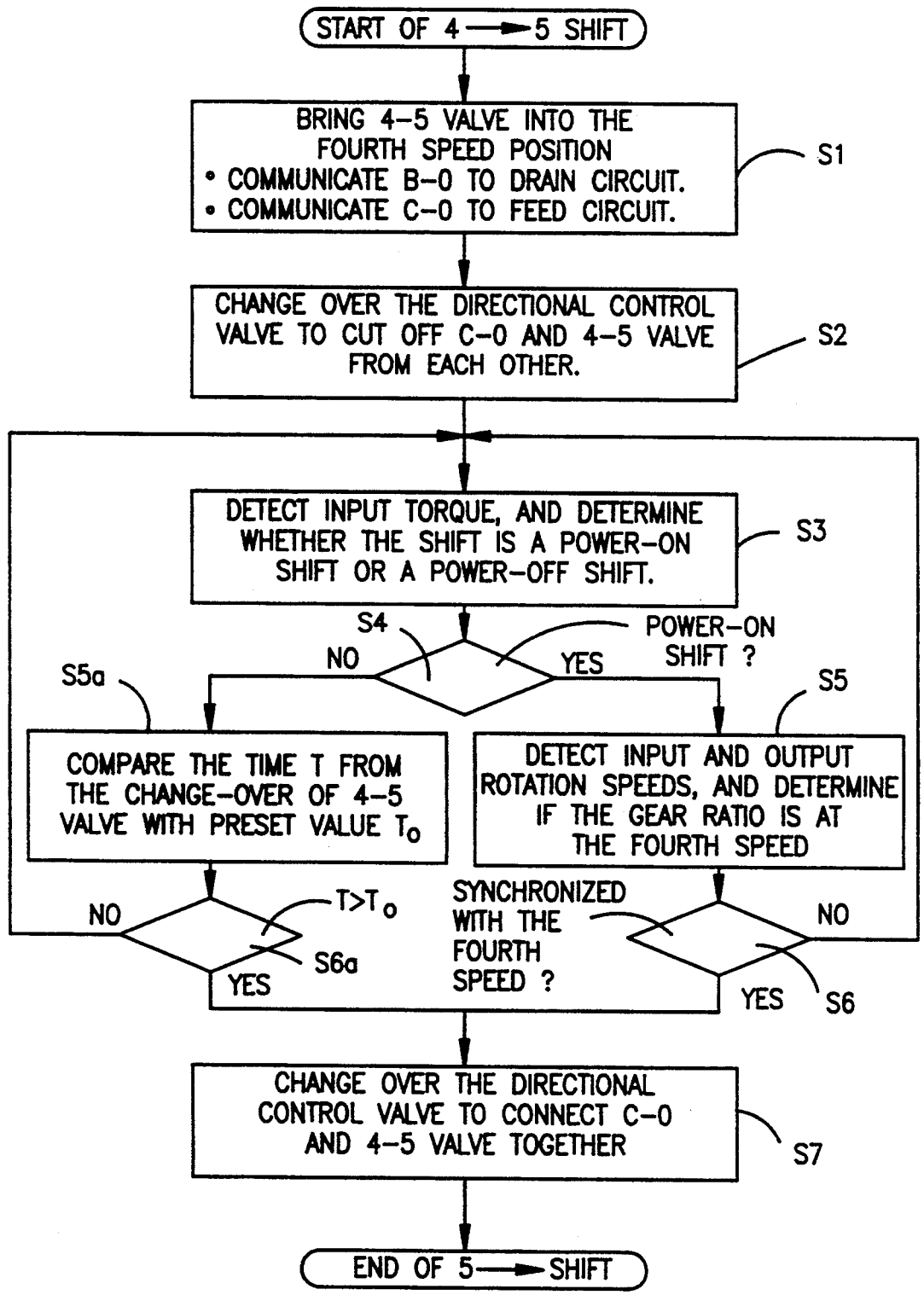
FIG. 4 is a flow chart showing control by the servo hydraulic pressure control system in FIG. 1 in a 5 → 4 shift.

Operation of the illustrated embodiment will now be described in accordance with the control flow charts shown in FIG. 4 (control steps in 5 → 4 shifting) and FIG. 5 (control steps in 4 → 5 shifting) while additionally referring to other drawings. Upon 5 → 4 shifting, the clutches C-1, C-2 and the brake B-2 are at first each maintained in an engaged state by applying drive range pressure D as servo hydraulic pressure. Although the position of the clutch C-0 remains unchanged between the fifth speed and the fourth speed, the servo hydraulic pressure of the clutch C-0 must be drained to release the overdrive. In step S1, the first solenoid 3, upon receipt of a signal indicating start of shifting, switches the 4–5 shift valve to the fourth speed position (to establish working oil lines indicated by dashed lines in FIG. 1). The brake B-0 is then connected with the drain EX via the 4–5 shift valve 4, whereby the brake B-0 is released. Although the line pressure PL acts on the feed/drain line 1a at this time, the line pressure PL is not fed to the clutch C-0 via the feed/drain line 1b because the directional control valve 5 has been changed over to cut off the line pressure P1 in step S2. As a consequence, the clutch C-O remains in the same released state as at the fifth speed.

The sequence next advances to step S3, where the magnitude of input torque is detected by the input torque detector 8 to determine whether the 5 → 4 shift is a power-on shift or a power-off shift. In step S4, the routine is allowed to advance, based on the results of the above determination, to step S5 where the 5 → 4 shift is a power-on shift or to step S5a where the 5 → 4 shift is a power-off shift.

In the power-on shift, the fourth speed position is achieved upon locking of the one-way clutch F-0 irrespective of the engagement of the clutch C-0. In step S5, it is hence determined by the input-output rotation detector 7 if the gear ratio is at the fourth speed. In step S6, based on the results of the above determination, the routine is allowed to advance to step S7 where the gear ratio has been synchronized with the fourth speed or if not, to return to step 3 until the gear ratio becomes synchronized with the fourth speed.

In step S7, the second solenoid is actuated by a control signal from the electronic control unit ECU 22 so that the directional control valve 5 is changed over to communicate the line pressure PL to the clutch C-0. The servo means for the clutch C-0 is now actuated for the first time to engage the clutch C-0. The above routine is designed to advance to step S7 after waiting for the results of the determination in step S6 as to whether or not the gear ratio has been synchronized with the fourth speed. It is however possible to advance to step S7 at a suitable time prior to the synchronization.

In the power-off shift, on the other hand, it is impossible to achieve the fourth speed position by locking the one-way clutch F-0. In the step S5a, the time T elapsed from the change-over of the 4–5 shift valve 4 is in step S1 and a preset time $T_0$ are compared using a timer with which the electronic control unit ECU 22 is inherently provided. Next, it is determined in step S6a whether or not the elapsed time T exceeds the preset time $T_0$. When the elapsed time T is longer than the preset time $T_0$, the routine then advances to step S7 where, as in the power-on shift, the directional control valve 5 is changed over to cause the line pressure PL to act on the clutch C-O. Incidentally, the time $T_0$ can be preset at a suitable value in accordance with the vehicle speed, the throttle opening, etc.

The 4 → 5 shift will next be described with reference to FIG. 5. First, upon receipt of a signal indicating start of the shift, the second solenoid 6, in step S1, switches the directional control valve 5 to the position indicated by the dashed lines in FIG. 1 so that servo hydraulic pressure is drained from the clutch C-0. As a consequence, release of the clutch C-O begins immediately. In step S2, the time T elapsed from the change-over of the directional control valve 5 is compared with a preset time $t_0$ which is determined by the vehicle speed, the throttle opening and the like.

Next, is determined in step S3 whether or not the time T exceeds the preset time $T_0$. When the time T is longer than the preset time $T_0$, the routine then advances to step S4 where the 4–5 shift valve 4 is brought into the fifth speed position via the first solenoid 3. When the 4–5 shift valve 4 has been brought to the fifth speed position, the lines pressure PL is caused to act on the servo means for the brake B-0 so that the brake B-0 begins to engage. Here again, the time $T_0$ can be preset at a suitable value in accordance with the vehicle speed, the throttle opening, etc. By adjusting the timings of change-over of the 4–5 shift valve 4 and the directional control valve 5, the timings of engagement and release of the brake B-0 and the clutch C-0 can be adjusted to values appropriate for 5 → 4 shifting or 4 → 5 shifting at a high vehicle speed.

The feeding of hydraulic pressure during the 5 → 4 or 4 → 5 shift will next be described. As indicated by the individual thick solid lines in FIG. 6, which illustrates the hydraulic circuit in detail, the line pressure PL is fed to the brake B-0 via the 4–5 shift valve 4, along the servo hydraulic pressure feed/drain line 1 under the timing control of the directional control valve 5, and then along the line marked by dots in the drawing. On the other hand, the drive range pressure D is fed to the clutch C-1 directly, to the clutch C-2 via the 3–4 shift valve 12, and to the brake B-2 via the 2–3 shift valve 13, all along the respective lines indicated by solid thick lines in the drawing. In FIG. 6, the dashed lines and circled lines indicate lines for signal pressures applied by the solenoids SL1–SL4 to pressure-receiving portions of the corresponding valves.

Figure 2:
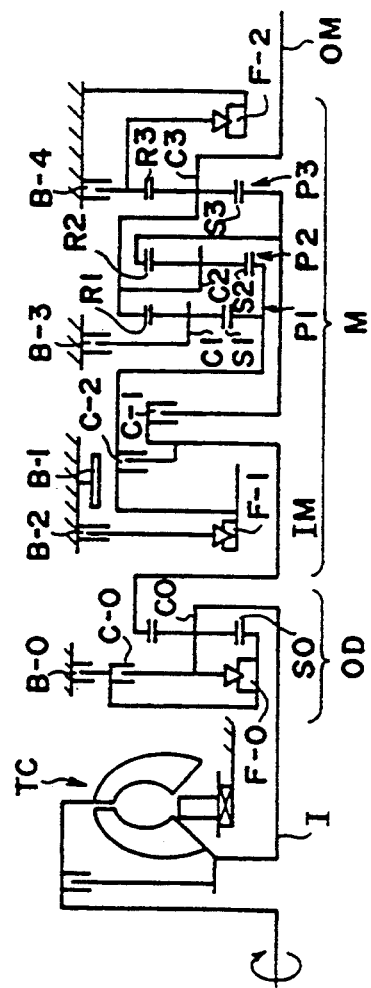
FIG. 2 is a skeleton diagram of an illustrative gear train of an automatic transmission controlled by the system of FIG. 1.

When the four frictional engagement elements are caused to engage as described above, an input enters via the carrier C0 of the overdrive unit OD in the gear drain shown in FIG. 2. The input is then outputted, as a reaction force produced due to holding of the sun gear S0, from the ring gear R0. This overdrive rotation enters from both the clutches C-1, C-2 of the primary shifting unit M to the sun gear S2 and the ring gear R2 of the planetary gear P2. Rotation, which has been caused as a result of locking of the planetary gear P2, is outputted, as is, from the carrier C3 of the planetary gear P3 to the output shaft OM.

In the servo hydraulic pressure control system according to the above-described embodiment, engaging of the clutch C-0 of the overdrive unit OD (the first frictional engagement means), upon 5 → 4 shifting, is performed either by confirming achievement of the fourth speed position by release of the brake B-0 (the second frictional engagement means) or by lapse of a time sufficient to achieve the fourth speed position. It is therefore possible to inhibit the occurrence of a shift shock without accelerating the rotation of the engine which would otherwise occur due to a premature rise of engaging pressure for the clutch C-0. Upon 4 → 5 shifting, on the other hand, drainage of the servo hydraulic pressure for the clutch C-0 is effected prior to change-over of the 4–5 shift valve so that the timing of engagement of the brake B-0 can be set in expectation of its poor release during high-speed rotation. It is therefore possible to inhibit the occurrence of a shift shock which would otherwise take place in the overdrive unit OD due to "tie-up", when the brake B-0 engages while the clutch C-0 is still engaged, due to centrifugal hydraulic pressure in the servo cylinder.

The present invention has been described in detail based on one embodiment in which the present invention is applied to a five-speed automatic transmission. It is to be noted that application of the present invention is not limited to such automatic transmissions. Other constructions including modifications of the respective elements described above can be suitably adopted within the scope of the present invention, as defined by the appended claims.

We claim:

1. A control system for servo hydraulic pressure in an automatic transmission provided with planetary gear mechanisms disposed between an input shaft and an output shaft, each planetary gear mechanism having plural shifting elements which can be connected to establish different power flow paths in accordance with engagement and release of frictional engagement elements to achieve a chosen one of plural gear speed stages, said control system comprising:

first frictional engagement means and first fluid pressure communication means for feeding servo pressure to said first frictional engagement means for engagement and for draining servo pressure from said first frictional engagement means for release;

second frictional engagement means and second fluid pressure communication means for feeding servo pressure to said second frictional engagement means for engagement and for draining servo pressure from said second frictional engagement means for release;

a shift valve for switching said feeding and draining of said servo pressure to and from each of said first and second frictional engagement means, thereby controlling switching of said first and second frictional engagement means between engaged and released states, and thereby shifting between first and second gear speeds;

a first solenoid for switching said shift valve;

a directional control valve, for controlling feeding or draining or said servo pressure to or from the first frictional engagement means, provided in a first servo pressure feed/drain line connecting said shift valve and said first frictional engagement means;

a second solenoid for switching said directional control valve;

detection means including an input torque detector for detecting input torque to the automatic transmission; and an electronic control unit for outputting control signals to the first and second solenoids in accordance with a determination of a power-on or power-off down-shift, based on the detected input torque, said electronic control unit changing timings of control signals output to the first and second solenoids in accordance with said determination, so timings of feeding and draining of the servo pressure to and from the first and second frictional engagement means are changed by predetermined relative amounts.

2. A control system for servo hydraulic pressure in an automatic transmission according to claim 1, wherein said detection means further includes an input and output rotation detector for detecting the gear ratio of the automatic transmission, said electronic control unit, upon determining a power-on down-shift in accordance with the detected input torque, outputting a control signal to the first solenoid for switching the shift valve to drain the servo pressure from the second frictional engagement means, and outputting a control signal to the second solenoid for switching the directional control valve for feeding the servo pressure to the first frictional engagement means upon determining that the detected gear ratio is the chosen gear speed stage.

3. A control system for servo hydraulic pressure in an automatic transmission according to claim 1, wherein said electronic control unit, upon determining a power-off down-shift in accordance with the detected input torque, outputting a control signal to the first solenoid for switching the shift valve to drain the servo pressure from the second frictional engagement means, and outputting a control signal to the second solenoid for switching the directional control valve to feed the servo pressure to the first frictional engagement means responsive to lapse of a preset time from the switching of the shift valve.

4. A control system for servo hydraulic pressure in an automatic transmission according to claim 3, wherein said preset time is set in accordance with vehicle speed and throttle opening.

5. A control system for servo hydraulic pressure in an automatic transmission according to claim 1, further comprising a one-way clutch disposed parallel to first frictional engagement means.

6. A control system for servo hydraulic pressure in an automatic transmission according to claim 2, further comprising a one-way clutch disposed parallel to first frictional engagement means.

7. A control system for servo hydraulic pressure in an automatic transmission according to claim 3, further comprising a one-way clutch disposed parallel to first frictional engagement means.

8. A control system for servo hydraulic pressure in an automatic transmission according to claim 4, further comprising a one-way clutch disposed parallel to first frictional engagement means.

* * * * *